Sept. 19, 1950     H. H. GOTBERG     2,522,712
MACHINE FOR BROACHING INTERNAL GEARS Filed Jan. 22, 1947     7 Sheets-Sheet 1

INVENTOR.
Harry H. Gotberg.
BY
Harness, Dickey & Pierce.
ATTORNEYS.

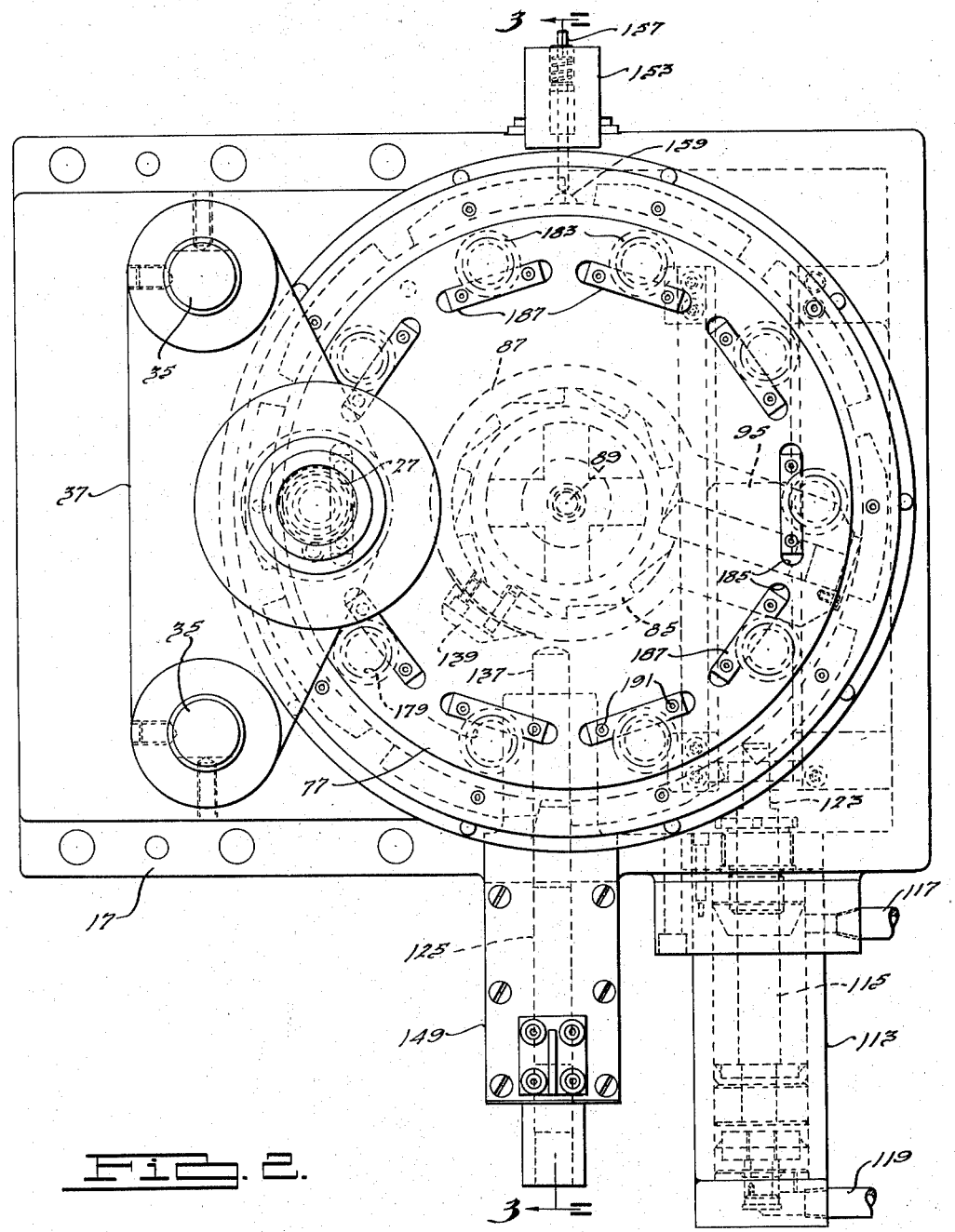

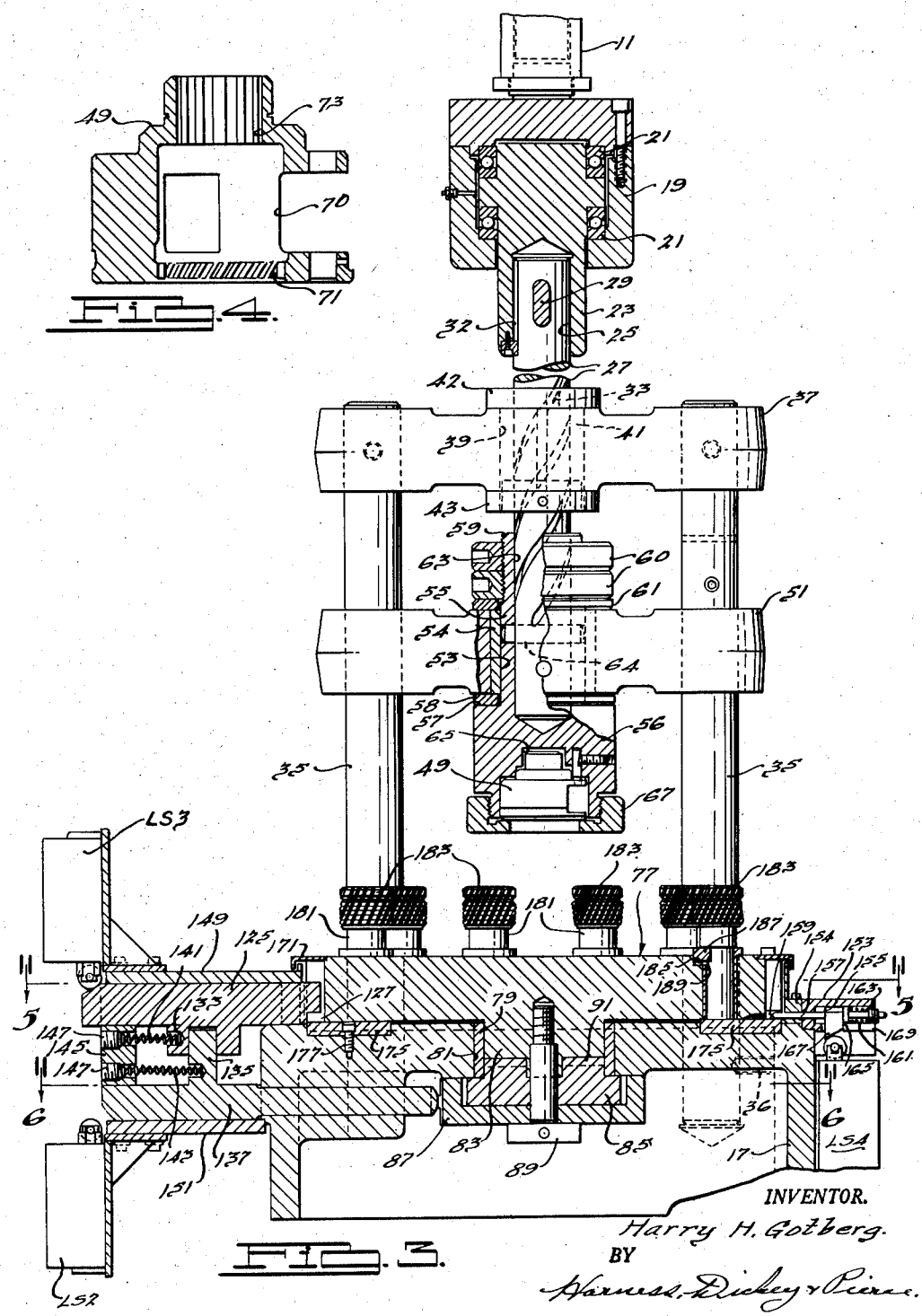

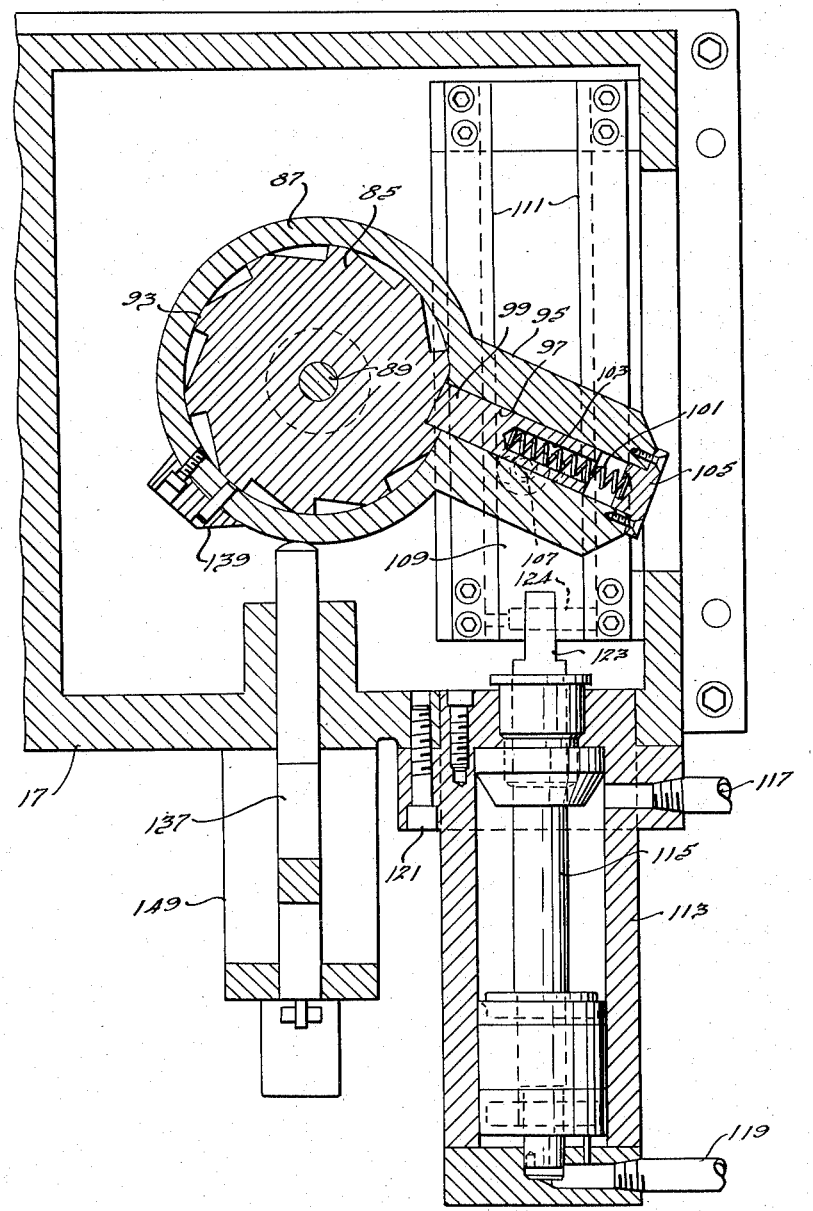

Sept. 19, 1950 H. H. GOTBERG 2,522,712
MACHINE FOR BROACHING INTERNAL GEARS
Filed Jan. 22, 1947 7 Sheets-Sheet 6
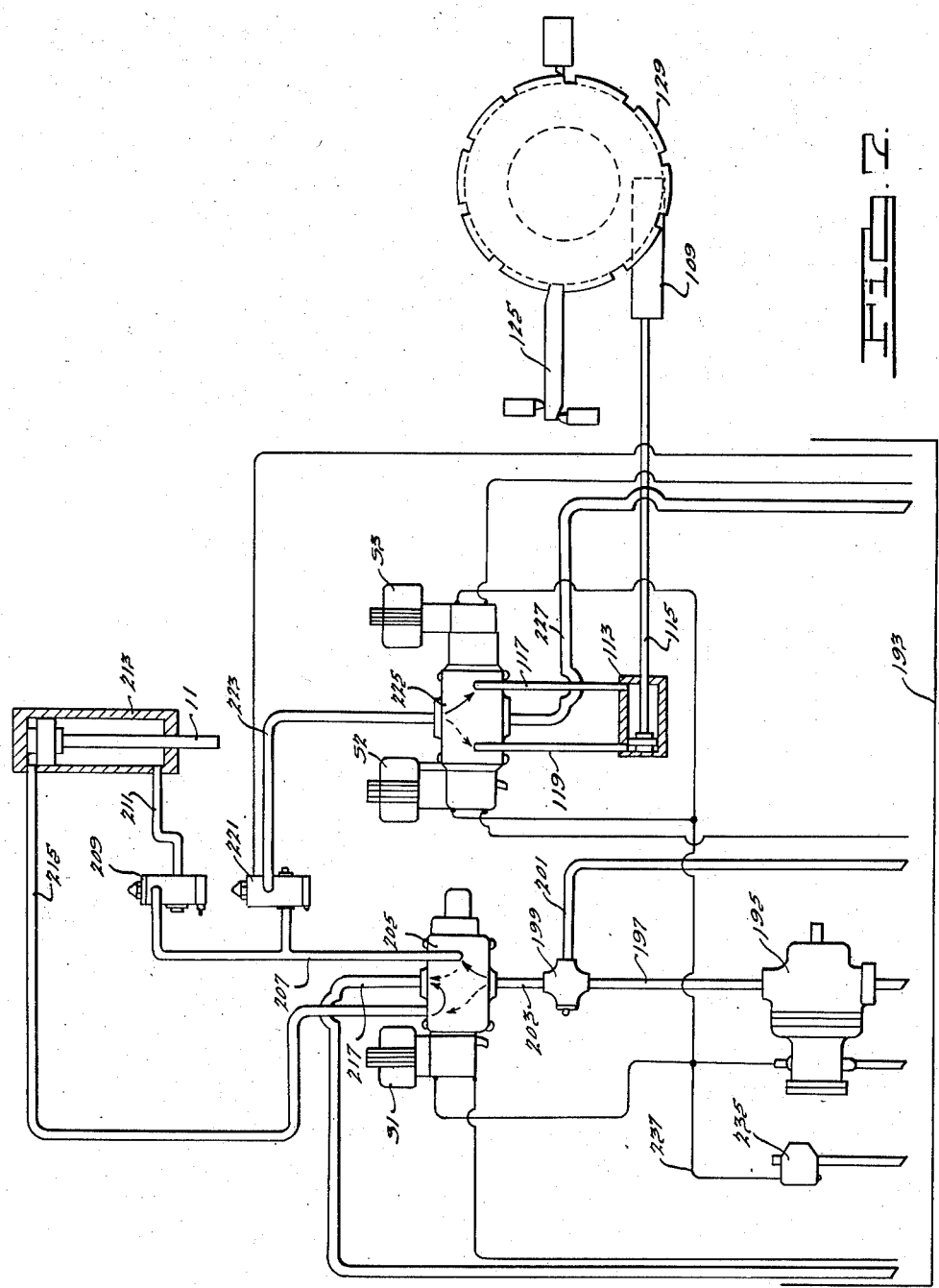
INVENTOR.
Harry H. Gotberg.
BY
Harness, Dickey & Pierce.
ATTORNEYS.

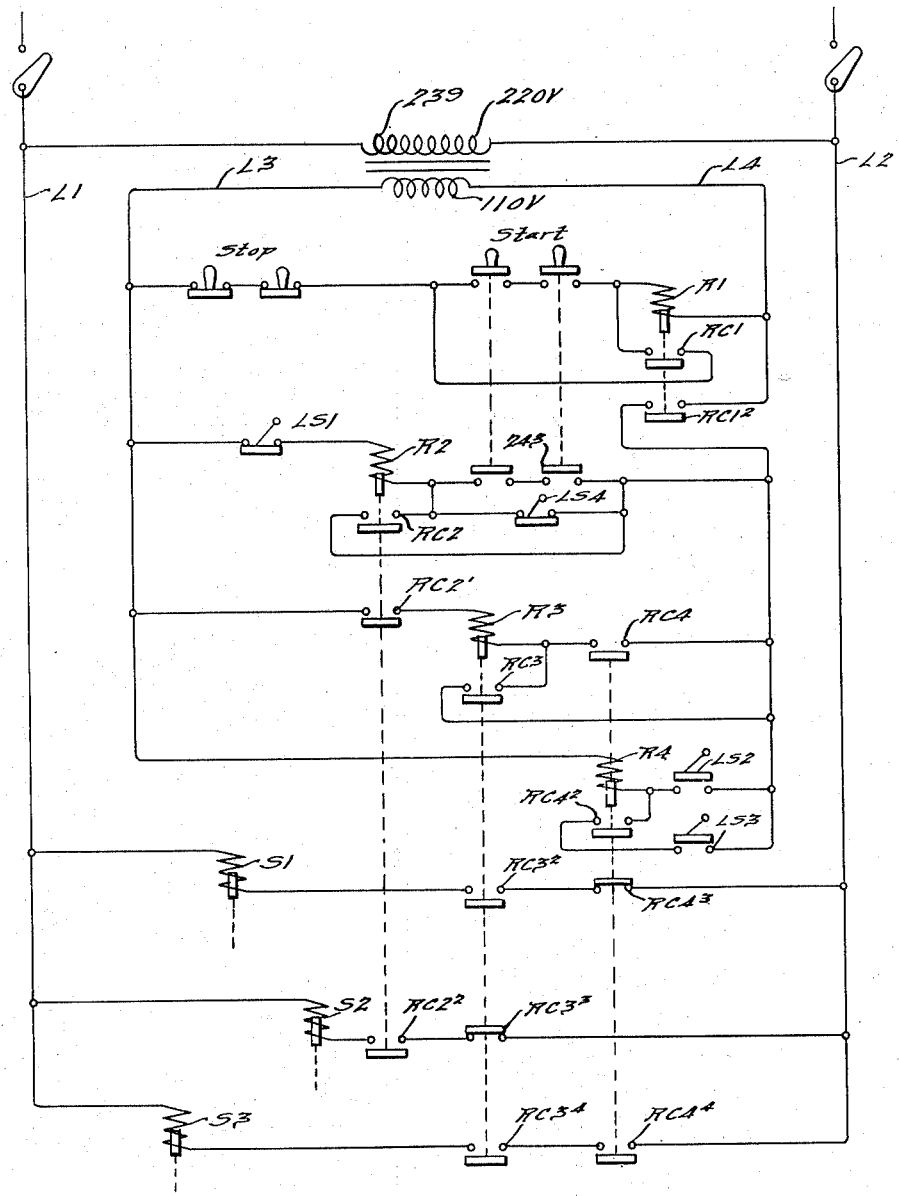

UNITED STATES PATENT OFFICE 2,522,712

MACHINE FOR BROACHING INTERNAL GEARS

Harry H. Gotberg, Detroit, Mich., assignor to Colonial Broach Company, Warren Township, Macomb County, Mich., a corporation of Delaware Application January 22, 1947, Serial No. 723,599

3 Claims. (Cl. 90—10)

This invention relates to broaching machines, and more particularly to machines for broaching internal gears.

The broaching of internal gears has been practiced with considerable success with long pull broaches which are pulled entirely through the gear blank and complete the gear in a single pass. However, in some cases internal gears are provided with inwardly directed webs or flanges which will not permit the pasage of the broaching tool. Accordingly, in such cases, slower and more expensive methods of machining the teeth have been employed.

Accordingly, it is the general object of the present invention to provide an automatic machine for broaching internal gears by the use of a plurality of short strip broaches which are pushed into and withdrawn from the gear blank in succession.

Another object of the invention is to provide a machine of the type described capable of broaching helical internal gear teeth.

These and other objects of this invention will become more apparent from the following detailed description taken in conjunction with the accompanying drawings, in which Figure 1 is a perspective view of the broaching machine of this invention;

Fig. 2 is a plan view of the structure illustrated in Fig. 1;

Fig. 3 is a cross-sectional view taken along the line 3—3 of Fig. 2;

Fig. 4 is a vertical cross-sectional view illustrating one type of gear on which internal gear teeth are formed by the machine of this invention;

Fig. 6 is a cross-sectional view taken along the line 6—6 of Fig. 3;

Fig. 7 is a schematic diagram of the hydraulic circuit of this invention, and

Fig. 8 is a schematic diagram of the electrical circuit of this invention.

Figure 1:
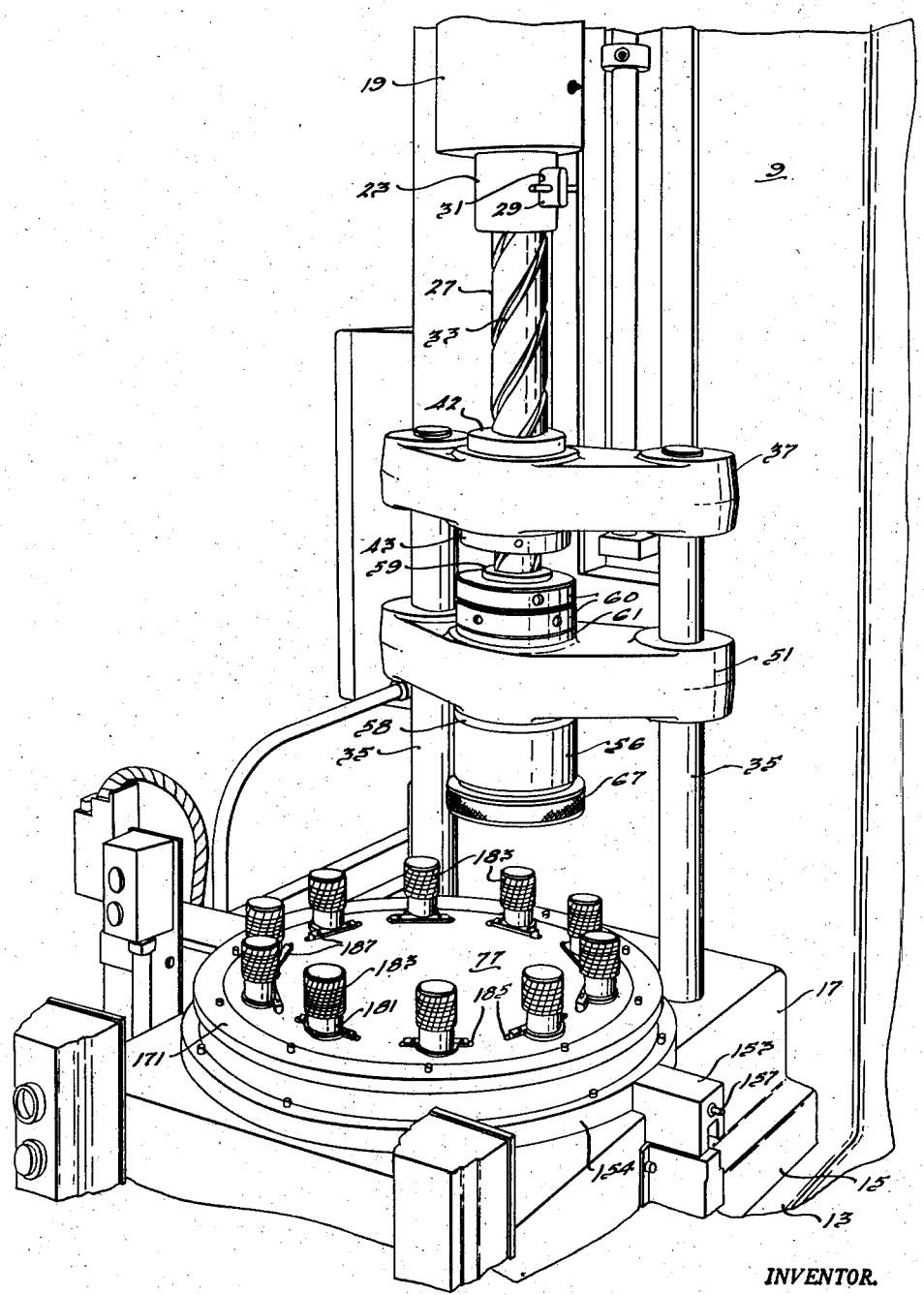
Figure 5:
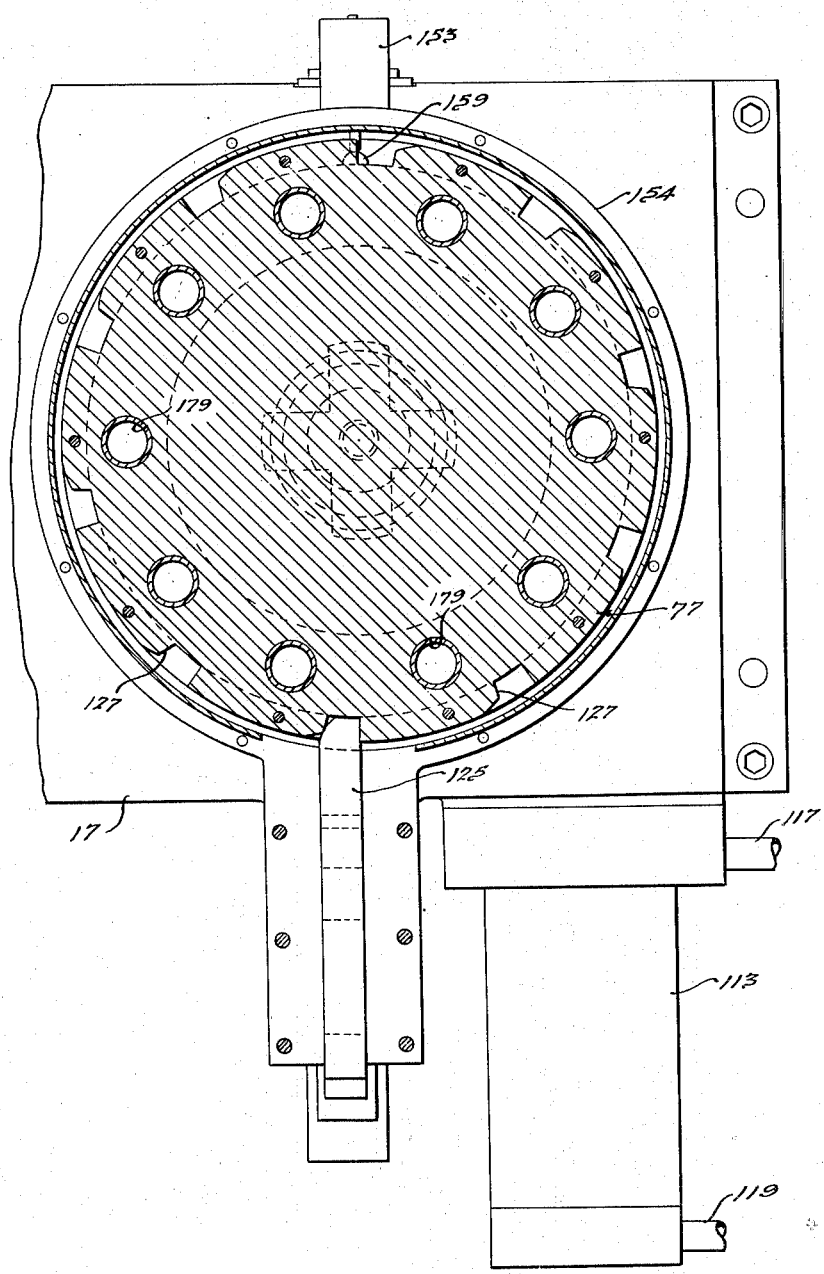
Fig. 5 is a cross-sectional view taken along the line 5—5 of Fig. 3.

Referring now to the drawings, reference character 9 designates the frame of a vertical press, the details of construction of which, since they form no part of the present invention, will not be considered further. The press incorporates a vertically movable ram 11 which is reciprocated in the usual manner by a hydraulic piston-type motor and a table 13 which carries a bed plate 15 upon which is rigidly mounted a boxlike support 17. Connected to the lower end of the ram plunger 11 is a split head element 19 provided with a pair of vertically spaced thrust bearings 21 which rotatably support a socket 23, a portion of which depends below the head element 19. The lower end of the socket 23 is provided with a recess 25 adapted to receive the upper end of a lead bar 27. The lead bar 27 is pinned to the socket 23 by means of a tapered pin 29 which passes through a slot 31 in the wall of the socket 23 and also by a key 32 inserted between the wall of the socket and the lead bar. The outer periphery of the lead bar 27 is formed with grooves 33 which extend helically along the length thereof.

Extending upwardly from the support 17 are a pair of vertical cylindrical bars 35, the lower ends of which are secured to the support by set screws 36. Secured adjacent the upper end of each of the vertical bars 35 and extending therebetween is a forged supporting element 37 which is provided with an opening 39 in the center thereof. A sleeve 41 is positioned within the opening 39 and has an annular flange 42 on the upper end thereof which rests upon the top of supporting element 37. The opposite end of the collar 41 extends below the supporting element 37 and a nut 43 is threaded thereon to fixedly secure the collar 41 in the supporting element opening 39. The inner wall of the collar 41 is formed with helical splines adapted to ride in the helical grooves 33 on the lead bar and cause the lead bar, when it is reciprocated upwardly and downwardly, to rotate so that helical gear teeth may be cut on a gear blank 49 carried on the lower end of the lead bar, as hereinafter described.

Below the supporting element 37 a similarly shaped element 51 is provided which is slidable on the vertical bars 35. The sliding element 51 is provided with an opening 53 extending vertically through the center thereof in which a sleeve bearing 54 is positioned which in turn rotatably receives the shank portion 55 of a chuck 56. Below the shank portion 55, the diameter of the chuck 56 is enlarged to provide an annular flange 57 which abuts against a washer 58 positioned between the flange and the bottom surface of the sliding element 51. The upper end of the chuck 56 is threaded at 59 and a pair of lock nuts 60 are threaded thereon to abut against a washer 61 seated upon the top surface of the sliding element 51 so that the nuts 60 and the entire chuck can rotate in the sliding element 51. The chuck 56 is provided with a socket 63 in which is fitted the lower end of the lead bar 27. The lower end of the lead bar is then keyed, by means of a key 64, to the chuck 56, so that as the lead bar 27 rotates the chuck 56 likewise will rotate. This effects rotation of the gear blank 49 which is secured in a recess 65 in the lower end of the chuck by means of a threaded cap 67.

The gear blank illustrated in the drawings, and in detail in Fig. 4, is of the type having an opening in the center thereof with the gear teeth 71 formed by the machine of this invention on the periphery thereof adjacent the front face of the gear blank. The opposite end of the opening 70 is of a reduced diameter as at 73 so that it is impossible for the gear teeth forming broach to pass completely through the gear blank. However, it will be readily apparent that the gear blank shown in the drawings is for purposes of illustration only and the invention contemplates the forming of internal gear teeth on any suitable type gear blank. Likewise the chuck 56 illustrated in the drawings has its lower end recessed to receive only the gear blank shown, but could be made to receive any suitable type gear blank.

Rotatably mounted in and projecting upwardly from the support 17 is a broach supporting drum generally designated at 77. This drum is rotatable upon a vertical axis in a sleeve bearing 79 inserted in an opening 81, and is adapted to be turned in an intermittent manner by any suitable form of indexing mechanism. Thus in the illustrated embodiment of the invention, the reduced bearing portion 83 of the drum carries within support 17 a horizontally disposed ratchet wheel 85 and a cup actuator element 87 enclosing the ratchet wheel. The ratchet wheel and actuator element are coaxially mounted with respect to the drum and the bearing portion 83, and are secured to the latter portion by the cap screw 89. The ratchet wheel is keyed to rotate with the drum as indicated at 91, but the actuator is independently rotatable. The ends of the teeth 93 of the ratchet wheel are concentric with respect to the common axis of rotation of the ratchet wheel and work holding drum and provide a smooth bearing surface engaging the interior of the actuator.

As illustrated in Fig. 6, the actuator 87 has a laterally projecting arm 95 provided with a radial internal passage 97 open at its inner extremity, in which a pawl 99 is slidable to and from an inter-engaging relation with respect to the ratchet teeth 93. The pawl is urged inwardly with respect to the teeth by a helical compression spring 101 arranged in a bore 103 formed in the pawl and reacting at its outer extremity against a cap 105 which closes the end of the passage.

The arm 95 also carries a downwardly projecting pin 107 engaging in a transverse slot formed in an indexing slide member 109 movable beneath the arm 95 in a path tangential with respect to the orbit of the pin in such a manner that, on reciprocation of the slide, intermittent rotation is imparted to the ratchet wheel, and accordingly to the drum, the nose portion of the pawl ratcheting over the teeth 93 when the actuator is turned in a counterclockwise direction, as viewed in Fig. 6, and picking up a tooth to turn the ratchet wheel in a clockwise direction upon the reverse or outward stroke of the slide, as will be readily apparent.

The slide 109 is mounted in ways formed by a pair of rails 111 rigidly mounted in the support 17 and is actuable by an indexing cylinder and piston assembly, the cylinder of which is generally designated at 113. The cylinder and piston assembly may be of any suitable construction. As illustrated, the piston rod 115 is connected to slide 109 and may be reciprocated by supplying fluid to one end of the cylinder and exhausting it from the other through conduits 117 and 119. It will be noted that the head of the cylinder assembly is secured to the support 17 by means of cap screws 121 with its body extending exteriorly therefrom and only the piston rod projecting into the interior of the support. The entire actuator cylinder assembly is thus readily removable for inspection and servicing. The inner extremity of the piston rod is connected to the slide by means of a coupling member 123 attached to the extremity of the rod and transfixed by pin 124 carried by the slide.

In the intervals between indexing movement of the drum, it is held against rotation by an index lock pluger 125 radially movable to and from a position in which it projects into any one of a series of peripherally spaced notches 127 formed in the drum. The plunger 125 is provided with a downwardly projecting portion 133 which lies outside of the support 17 and is keyed by means of a transversely disposed interfitted portion generally designated 135, as seen in Fig. 3, to a cam follower plunger 137 slidable as a unit with plunger 125 and projecting through the side of the support 17 to a position adjacent the actuator 87.

The plunger 137 is actuable by cam lobe 139 rigidly secured to the periphery of the actuator 87, as seen in Fig. 6. The cam lobe is so located and contoured as to urge the plunger 137 outwardly and thereby free the index lock plunger 125 from one of the notches 127 as the actuator completes its counterclockwise movement, as the parts are again viewed in Fig. 6. The plungers 125 and 137 are urged inwardly by a pair of helical compression springs 141 and 143 supported partly by the respective plungers and partly in the laterally extending section 145 of the support 17 which carries the plungers and related elements. Plugs 147 are provided in the supporting portion 145 to retain the springs in position. Top and bottom plate portions 149 and 151, respectively, of the supporting section 145 carry limit switches LS—3 and LS—2, respectively, the former actuable by the plunger 125 and the latter by the plunger 137. The purpose and electrical arrangement of these switches will presently be considered.

A housing 153 is secured to one side of the support 17 in abutting relation with a cylindrical sealing flange 154. The housing 153 is provided with a radial recess 155 extending inwardly from the outer end thereof. The inner vertical wall of the housing 153 is provided with an opening for a push rod 157 which extends inwardly through the flange 154 to a position adjacent the periphery of drum 77. A cam element 159 is secured to the outer periphery of the drum 77 and adapted upon rotation thereof when opposite the rod 157 to contact the same and force it outwardly. Surrounding the rod 157 at its outer end is a helical spring 161, one end of which abuts a washer 163 which in turn abuts the outer wall of the housing 153. The inner end of the spring 161 abuts against a washer 165 which in turn abuts against a downwardly projecting dog 167 rigidly mounted on the rod and extending downwardly through a slot 169 in the housing. Dog 167 is adapted to actuate a switch LS—4 for stopping rotation of the table after the machine has made a complete cycle of operations. The rod 157 is normally urged inwardly against the outer periphery of the drum but upon completion of the cycle the cam 159 forces the shaft outwardly against the action of the spring and causes the dog 167 to actuate the switch LS—4.

Secured to the upper surface of the drum 77 is a peripheral flange element 171 which cooperates with flange 154 to prevent the ingress of dirt and dust into the mechanism. A wear ring 175 is secured to the top surface of the support 17 by means of countersunk screws 177 and supports the drum during rotation.

The top face of the drum 77 is provided with a plurality of circumferentially spaced cylindrical apertures 179 which receive the shanks 181 of strip broaches 183. The top face of the table is recessed as at 185 to receive keys 187 for each strip broach. The keys fit into the recess 185 and against flat portions 189 on the shanks of the broaches. Each key 187 is secured to the drum by means of screws 191.

In the embodiment illustrated in the drawing, each strip broach 183 is formed with teeth thereon adapted to cut all of the helical gear teeth on the internal surface of the gear blank 49 and each successive broach 183 is of a larger size than the one prior thereto so that the gear blank when it is reciprocated contacts the smallest broach first, and then after the gear blank has been raised out of contact with the broach, the drum rotates due to the indexing mechanism and the next larger broach is presented in the correct position for broaching the gear blank. This alternate rotation and reciprocation continues until the gear blank has been broached by the largest and the final sized broach 183, whereupon the rotation of the drum is automatically stopped and the finished gear can be removed, a new blank put in its place, and the operation repeated.

Certain of the hydraulic and electrical components are depicted in diagrammatic form only, since their details form no part of the present invention. The hydraulic system includes a reservoir generally indicated at 193. From the reservoir, hydraulic fluid is pumped by the main pump 195 through the appropriate conduit means as 197 to an overload relief valve 199 which, if the pressure is too great, will return the fluid through conduit 201 to the reservoir. If the fluid pressure is normal, the valve 199 will allow the fluid to pass through conduit 203 into a pilot operated four-way valve 205 which is solenoid controlled in one direction and spring returned in the other. The four-way valve 205 is operated in one direction by the solenoid S—1 which is spring biased so that in its normal position the fluid passes through a conduit 207, a foot valve 209, and then through conduit 211 into the lower end of the cylinder 213 for the ram plunger which controls the movement of the workpiece. When the fluid enters the lower end of the cylinder 213 it forces the piston upwardly and thus the fluid above the piston is forced out through conduit 215, the four-way valve 205, and conduit 217 to the reservoir 193.

When the valve-actuating solenoid S—1 is energized, it actuates the valve 205 to a position in which the pump output is connected to the conduit 215 leading to the upper extremity of the cylinder. The fluid below the piston is then forced out through the conduit 211, foot valve 209, four-way valve 205, and line 217 to the reservoir. Foot valve 209 operates to prevent such return flow until the pressure in the line 211 exceeds a predetermined value sufficient to prevent the ram from falling by gravity.

During the normal cycle of the machine, the solenoid S—1 is energized on completion of the downward stroke of the ram and thus affects an immediate return of the ram. When the ram piston reaches the upper end of its stroke, as shown in Fig. 7, it can move no further and consequently the pressure in line 207 will build up. Valve 221 which is positioned in a line 223 connecting lines 207 and a four-way valve 225, normally blocks flow through line 223 but opens automatically in response to a predetermined pressure in line 207 which pressure is in excess of that required to lift the piston in cylinder 213. This increased pressure only develops after the piston in cylinder 213 completes its upward stroke. When the valve 221 opens fluid is delivered to an open center four-way valve 225 which is of the pilot operated solenoid controlled in both direction, type. Normally the fluid passes through the four-way valve 225 and thence through the outlet conduit 227 back to the reservoir. However, when the solenoid S—2 is actuated, the fluid flows through the valve into the conduit 119 and thence into the cylinder 113 so as to push the piston rod 115 inwardly and cause the arm 95 to be moved. When the solenoid S—3 is actuated, the flow of the fluid is then reversed, and the fluid flows through the conduit 117 to return the piston rod 115 to its normal position and thereby index the drum 77. The return fluid flows out of the cylinder 113 through the line 119 and thence through the line 227 back to the reservoir.

While the solenoid control valves may be of any desired type they are preferably operated by hydraulic pilot pressure which is controlled by pilot valves which in turn are operated by the solenoids S—1, S—2 and S—3. Since such valves are of conventional construction, they need not be illustrated or described in detail. The supply pump 235 for the pilot system may be mounted and drivable with the main pump 195, as shown in Fig. 6, conventional pilot fluid connections being schematically indicated in that view and generally designated at 237.

The electrical connections and the principal electrical components employed to control the operation of the machine are depicted diagrammatically in Fig. 8. As previously indicated, the machine normally stands with the head or ram in the raised position. The valve actuating solenoids S—1, S—2, and S—3 are indicated as powered from a 220 volt source. The supply lines to these elements being designated L—1 and L—2. The other electrical components may operate at 110 volts derived from a step down transformer 239 and delivered by way of the conductors L—3 and L—4. A pair of button-type starting switches designated "Start" are normally open and bridged by holding relay contact RC—1. The actuating coil R—1 of the relay is in series with the start button switches, as shown. A pair of normally closed stop button switches may also be provided in series with the relay coil R—1 and the start button switches, and all of these button switches are, of course, located upon the machine in positions convenient to the operator. A second contact actuated by the relay R—1 and designated RC—1² is connected in a series-parallel circuit with three additional relay coils R—2, R—3 and R—4. Arranged in parallel with the relay coil R—2 are a pair of contacts 241 adapted to be closed by extensions 243 of the start button switches at the same time the latter are closed when starting the machine. The normally closed limit switch LS—4 likewise is in parallel with the contacts 241, as shown, and is adapted to be opened by the cam 159 on the drum as previously mentioned. The parallel circuit just described is bridged by a normally open holding relay contact RC—2 which is closed when relay coil R—2 is energized. In series with the relay coil R—2, the relay contacts RC—2 and the parallel circuits just described is a limit switch LS1 which closes when the head or ram is fully raised and is opened when the head reaches the bottom of its stroke. In series with the relay coil R—3 is a normally open contact RC—2¹ actuable by coil R—2, and a pair of parallel circuits are interposed between the contact RC—1² and the conductor 245. These parallel circuits contain normally open contacts RC—4 and RC—3, contact RC—3 being closable by the relay coil R—3, while contact RC—4 is closable by energization of the relay coil R—4. In series with the relay coil R—4 is a limit switch LS—2, previously mentioned, of the normally open type which is closed by the cam plunger 137 as it completes its outward movement and opens when the cam plunger begins its inward movement. Limit switch LS—2 is shunted by a circuit containing in series a limit switch LS—3, and a contact RC—4². Limit switch LS—3 is of the normally open type, but is held closed by the index locking plunger 125, except when the index locking plunger reaches its innermost position. Contact RC—4² is normally open but is closed on energization of coil R—4.

In series with the solenoid S—1 are two contacts RC—3² and RC—4³. Contact RC—3² is normally open and is closed when relay coil R—3 is energized while contact RC—4³ is normally closed and is opened when relay coil R—4 is energized.

In series with valve actuating solenoid S—2 are two relay contacts RC—2² and RC—3³. Contact RC—2² is of the normally open type and is closed by energization of relay coil R—2 while contact RC—3³ is normally closed and is opened on energization of relay coil R—3. In series with valve actuating solenoid S—3 are two normally open contacts RC—3⁴ and RC—4⁴. Contact RC—3⁴ is closed on energization of the relay coil R—3 while contact RC—4⁴ is closed on energization of relay coil R—4.

The machine operates automatically and continuously after closing both of the starting button switches until current to the relay coil R—1 is interrupted by the stop button switches or when the limit switch LS—4 is opened after the completion of the broaching cycle, as will be hereinafter described. Considering the cycle as commencing with the ram in the fully raised position, closing the starting switches energizes relay coil R—1 and closes the holding contacts RC—1 and RC—1². The relay coil R—2 is energized by the contacts 243, which are connected to the starting button switches. Thus closing the holding contact RC—2 and RC—2¹ and RC—2². Since the contact RC—3³ is normally closed, the solenoid S—2 will be energized, and closure of the completed circuit through the 220 volt supply lines L—1 and L—2 and the energization of the solenoid S2 shifts the valve 225 to a position to direct fluid through conduit 119 and into the outer extremity of the cylinder 113 so that the indexing slide 109 moves in to rock the actuator 87 counterclockwise. As the actuator completes its counterclockwise movement, cam 139 forces out the cam follower plunger 137 and the connected index lock plunger 125. This closes limit switches LS—2 and LS—3. This completes a circuit through relay coil R—4, thereby closing contacts RC—4, RC—4², and RC—4⁴ and opening contact RC—4³. Closed contact RC—4² constitutes a holding contact for the coil R—4 so long as limit switch LS—3, in series with the last-mentioned contacts, remains closed. Closure of RC—4 energizes relay R—3 and thereby closes RC—3, RC—3² and RC—3⁴, and opens RC—3³. The contact then acts as a holding circuit to maintain the circuit to R—3 independently of relay R—4. The opening of the normally closed contacts RC—3³ and closure of the normally open contact RC—3⁴ de-energizes the valve actuating solenoid S—2 and energizes the solenoid S—3, thereby shifting valve 225 to its opposite position in which fluid under pressure is directed to the inner extremity of the cylinder 113 through the conduit 117. The indexing slide 109 is thereupon moved outwardly to turn the drum 77 clockwise, as preveiously described, through one indexing movement. Limit switch LS—2 opens at the commencement of such indexing movement, as the plungers 125 and 137 move inwardly partway when plunger 137 rides off the cam 139. The cam keeps the plunger out until the index lock slot 127 has moved away from the end of the plunger 125, and the last-mentioned plunger accordingly continues to ride upon the peripheral surface of the drum 77 until another of the slots 127 registers with such plunger, which occurs at the end of the indexing movement. During the indexing movement, therefore, although the plungers have moved in partway, so that LS—2 is open, the plungers are held out far enough to prevent the opening of limit switch LS—3. Limit switch LS—3 opens as the plunger assembly goes into the next slot 127 at the completion of the indexing movement, and relay coil R—4 is thereupon de-energized, opening the circuit to solenoid S—3 at contact RC—4⁴ and closing the circuit through solenoid S—1 at contacts RC—4³. The drum is therefore held stationary and solenoid S—1 thereupon shifts valve 205 to a position to connect supply line 203 to conduit 215 causing the ram to descend and broach the workpiece mounted in the ram, as previously described. At the lower extremity of movement of the ram, limit switch LS—1 is opened and de-energizes the relay coil R—2 and opens the contacts RC2, RC—2¹, and RC—2². This will be seen to interrupt the circuit through the conductor to relay coil R—3, and the de-energization of that coil breaks the circuit to solenoid S—1 at contacts RC—3². Valve 205 thereupon moves to the other position, reconnecting the lower extremity of the ram cylinder 213 to the pump output and the ram reascends. In the upper extremity of ram movement, limit switch LS—1 is again closed, closing the circuit to relay coil R—2 through the limit switch LS—4, and the cycle repeats until either the master relay contacts RC—1² are opened by de-energizing relay coil R1 due to the opening of the stop button switches, or until the drum has been indexed through a complete cycle so that the workpiece has been broached by all ten of the strip broaches 183.

When the drum has been indexed so that the complete broaching operation has taken place and the ram has moved back to its uppermost position, the cam 159 on the drum will contact the shaft 157 and cause the limit switch LS—4 to be opened. After this last indexing movement which caused the limit switch LS—4 to be actuated, the ram moves downwardly, as previously described, to re-engage the workpiece with the final sized strip broach 183, and as previously described the limit switch LS—1 is opened when the ram is in this position, thereby de-energizing the relay coil R—2 and opening the contact RC—2. As the limit switch LS—4 is now open, closure of the limit switch LS—1 will not energize R—2 in the usual manner because RC—2 is open. Therefore, the machine is rendered inoperative and will not start again until the operator pushes the start button switches into engagement.

While only one form of the invention has been shown and described herein, it will be apparent that variations in the design and construction may be indulged in without departing from the spirit of the invention or the scope of the appended claims. While the machine has been described as useful in the production of internal gears, it will be understood that it is equally adapted for use in producing internal splined members. Consequently, the term "gears," as employed in the specification and claims, should be construed to include either gears or splines.

I claim:

1. A machine for simultaneously forming all the teeth in an internal gear, comprising a gear blank holder adapted to carry a gear blank axially, means for reciprocating and rotating said gear blank holder, including lead bar means, a rotatable index table, means adapted to connect a plurality of stub broaches to said table, and table operating means for successively moving said broaches into alignment with said gear blank intermediate each successive cycle of reciprocation of said holder.

2. A machine for simultaneously forming all the teeth in an internal helical gear, including a rotatable index table, means for connecting a plurality of stub broaches with said table, a gear blank holder adapted to carry a gear blank, means for reciprocating and rotating said gear blank holder, including a reciprocable ram, a lead bar rotatably connected with said ram and operatively connected with said gear blank holder, and stationary nut means engaging said lead bar so as to cause rotation thereof during reciprocation of said gear blank holder, and table operating means for successively moving the stub broaches into alignment with said gear blank intermediate each successive cycle of reciprocation of said holder.

3. A machine for simultaneously forming all the teeth in an internal helical gear, including a rotatable index table, means for connecting a plurality of stub broaches with said table, a gear blank holder adapted to carry a gear blank, means for reciprocating and rotating said holder, including a reciprocating ram disposed above said rotatable index table, a lead bar, means rotatably connecting the upper end of said lead bar with said reciprocating ram, means operatively connecting the lower end of said lead bar with said gear blank holder and stationary nut means engaging said lead bar so as to cause rotation thereof during reciprocation of said gear blank holder, and table operating means for successively moving the broaches into alignment with the gear blank intermediate each successive cycle of reciprocation of said holder.

HARRY H. GOTBERG.

REFERENCES CITED

The following references are of record in the file of this patent:

UNITED STATES PATENTS

| Number | Name | Date |
| --- | --- | --- |
| 1,451,097 | Kitto et al. | Apr. 10, 1923 |
| 1,627,755 | Urschel | May 10, 1927 |
| 1,986,793 | Chapman et al. | Jan. 8, 1935 |